W STECHSCHULT.
Axle-Lubricator.

No. 41,945.  Patented Mar 15, 1864.

Witnesses:
J. W. Coombs.
M. M. Livingston.

Inventor:
William Stechschults,
per Munn & Co
attys

UNITED STATES PATENT OFFICE.

WILLIAM STECHSCHULT, OF GLANDORF, OHIO.

IMPROVEMENT IN AXLE-BOXES.

Specification forming part of Letters Patent No. 41,945, dated March 15, 1864.

*To all whom it may concern:*

Be it known that I, WILLIAM STECHSCHULT, of Glandorf, in the county of Putnam and State of Ohio, have invented a new and Improved Axle-Box; and I do hereby declare that the following is a full, clear, and exact description of the same, reference being had to the accompanying drawings, forming a part of this specification, in which—

Figure 1:
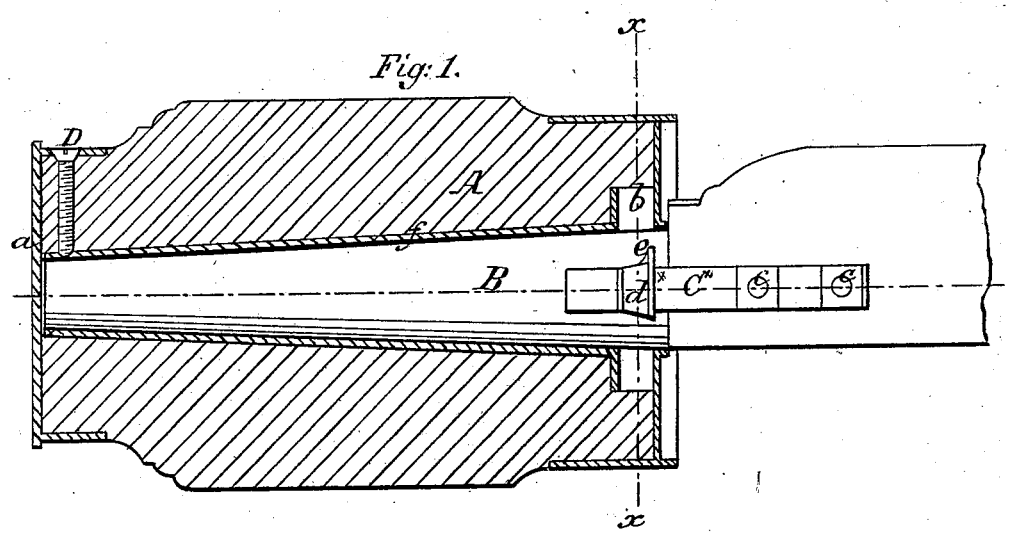
Figure 2:
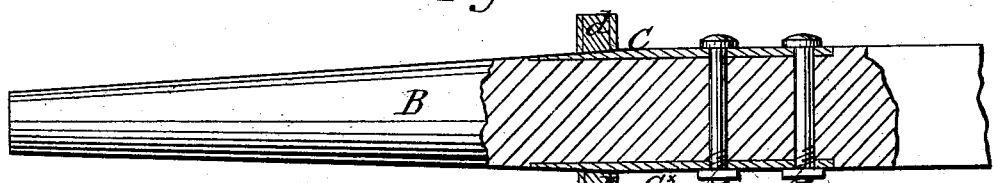
Figure 3:
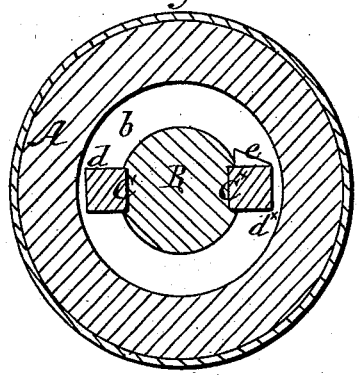

Figure 1 represents a longitudinal central section of my invention. Fig. 2 is a transverse vertical section of the same, taken in the plane indicated by the line $x\ x$, Fig. 1. Fig. 3 is a sectional plan or top view of the axle.

Similar letters of reference in all the views indicate corresponding parts.

This invention consists in the arrangement of two projections or lugs rising from plates or brackets that are secured to the axle by bolts or other suitable means, one or both of said projections being provided with noses or scrapers, in combination with a circular groove in the rear end of the hub or box and with an oil-hole in front, in such a manner that the oil contained in the circular groove at the rear end of the hub or axle-box is pushed out and spread on the axle by the action of the scraper or scrapers; and at the same time, by having two such plates or linchpins, one on either side of the axle, the strain of the wheel on the axle is equalized and the friction reduced.

To enable others skilled in the art to make and use my invention, I will proceed to describe it with reference to the drawings.

A represents the hub or axle-box of an ordinary wheel. This box is fitted with a cap, $a$, which completely covers its front end, and it is provided with a circular groove, $b$, at or near to its rear end.

B is the axle, which extends through the hub or box, and which may be made of wood or of iron. This axle is provided with two plates, C C*, which are let into suitable mortises in the sides of the axle, being fastened by bolts and nuts $f$ or by any other suitable means. Each of these plates is provided with a projection, $d\ d^*$, which fits into the circular groove in the hub A, and which prevents the axle from moving in a longitudinal direction, leaving it perfectly free, however, to rotate in the hub.

The projection $d^*$ of the plate C* is provided with a nose or scraper, $e$, whereby the oil or grease that may be contained in the groove $b$ is pushed back on the axle.

The axle is supplied with oil or grease through an oil-hole, D, in the front end of the axle-box. It is obvious that both projections or linchpins $d\ d^*$ might be provided with scrapers.

The groove $b$ may be formed by introducing a cast-iron tube, $f$, into the hub, and this tube extends through the entire length of said hub to protect it against wear by the axle.

By having the linchpins or plates C C* fastened on opposite sides of the axle the wheel strikes on both simultaneously, and the strain on the axle is thereby equalized and the friction reduced. If the linchpins wear out, the projections $d\ d^*$ can easily be taken off and replaced by a new set.

Having thus fully described my invention, what I claim as new, and desire to secure by Letters Patent, is—

The employment of the spreading-noses $e\ e$, in combination with the linchpins C C*, projections $d\ d^*$, groove $b$, and axle B, all in the manner herein shown and described, so that the grease or lubricating material will be caught and spread over the surface of the axle, as set forth.

WILLIAM STECHSCHULT.

Witnesses:
HERMANN H. RECKER,
AUGUST STECHSCHULT.